US012710793B2

(12) United States Patent
Kuk et al.

(10) Patent No.: US 12,710,793 B2
(45) Date of Patent: Aug. 18, 2026

(54) WINDOW AND DISPLAY DEVICE INCLUDING THE SAME

(71) Applicant: Samsung Display Co., Ltd., Yongin-si (KR)

(72) Inventors: Seung-Won Kuk, Yongin-si (KR); Kang-Woo Lee, Yongin-si (KR); Myungchul Kim, Yongin-si (KR); Sunghyun Kim, Yongin-si (KR); Aely Oh, Yongin-si (KR); Hyunseok Oh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 138 days.

(21) Appl. No.: 18/906,327

(22) Filed: Oct. 4, 2024

(65) Prior Publication Data

US 2025/0117047 A1 Apr. 10, 2025

(30) Foreign Application Priority Data

Oct. 5, 2023 (KR) ........................ 10-2023-0132498

(51) Int. Cl.
*G06F 1/16* (2006.01)

(52) U.S. Cl.
CPC .......... *G06F 1/1656* (2013.01); *G06F 1/1618* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,224,528 | B2 | 5/2007 | Phillips et al. | |
| 11,508,268 | B2 * | 11/2022 | Lee | G09F 9/301 |
| 11,765,847 | B2 | 9/2023 | Sunwoo et al. | |
| 11,768,520 | B2 * | 9/2023 | Kim | G06F 1/1652 361/679.56 |
| 12,131,672 | B2 * | 10/2024 | Lee | G06F 1/1641 |
| 12,265,425 | B2 * | 4/2025 | Kim | H04M 1/0214 |
| 12,342,712 | B2 * | 6/2025 | Kim | H10K 77/111 |
| 12,366,890 | B2 * | 7/2025 | Kuon | G06F 1/1616 |
| 12,429,922 | B2 * | 9/2025 | Kim | G06F 1/1681 |
| 2021/0359277 | A1 | 11/2021 | Jung et al. | |
| 2022/0093012 | A1 * | 3/2022 | Lee | G06F 1/1616 |

(Continued)

FOREIGN PATENT DOCUMENTS

| | | |
|---|---|---|
| KR | 10-0739242 | 7/2007 |
| KR | 10-2018-0079093 | 7/2018 |

(Continued)

*Primary Examiner* — Lisa Lea-Edmonds
(74) *Attorney, Agent, or Firm* — Lerner David LLP

(57) ABSTRACT

A display device includes a folding area foldable around a virtual folding axis, and a non-folding area adjacent to the folding area, a display panel, and a window disposed on the display panel. The window includes a patterned glass including a patterned part having at least one groove pattern on a top surface of the patterned part, and corresponding to the folding area, and a non-patterned part adjacent to the patterned part and corresponding to the non-folding area, and a filling layer filled in the at least one groove pattern. The filling layer includes a first filling part in contact with the patterned part, and a second filling part in contact with the first filling part.

20 Claims, 10 Drawing Sheets

(56) References Cited

U.S. PATENT DOCUMENTS

| | | | | |
|---|---|---|---|---|
| 2022/0374046 | A1* | 11/2022 | Kim | H04M 1/0214 |
| 2022/0376201 | A1* | 11/2022 | Kim | H10K 77/111 |
| 2023/0041968 | A1* | 2/2023 | Kim | B32B 17/04 |
| 2023/0078056 | A1* | 3/2023 | Lee | G06F 1/1652 361/679.01 |
| 2023/0195174 | A1* | 6/2023 | Kim | G06F 1/1652 361/679.01 |
| 2023/0305598 | A1* | 9/2023 | Kang | G06F 1/1652 |
| 2023/0400883 | A1* | 12/2023 | Kim | G06F 1/1652 |
| 2024/0224454 | A1* | 7/2024 | Kim | H10K 59/872 |
| 2024/0241549 | A1* | 7/2024 | Oh | G06F 1/1616 |
| 2024/0268193 | A1* | 8/2024 | Choi | B32B 15/09 |
| 2025/0046220 | A1* | 2/2025 | Lee | G06F 1/1616 |
| 2025/0117047 | A1* | 4/2025 | Kuk | G06F 1/1618 |
| 2025/0162285 | A1* | 5/2025 | Kim | B32B 5/024 |
| 2025/0295020 | A1* | 9/2025 | Kim | H10K 77/111 |

FOREIGN PATENT DOCUMENTS

| | | |
|---|---|---|
| KR | 10-2020-0034428 | 3/2020 |
| KR | 10-2246919 | 5/2021 |
| KR | 10-2022-0112104 | 8/2022 |

* cited by examiner

FIG. 6A

WM
FA2
FL
Fa2 Fa1
GP
PG
PG-F
PG-B
UGP
Fb2 Fb1
UFL
DR3
DR1
DR2

FIG. 6B

WINDOW AND DISPLAY DEVICE INCLUDING THE SAME

CROSS-REFERENCE TO RELATED APPLICATION

This application claims priority to and benefits of Korean Patent Application No. 10-2023-0132498 under 35 U.S.C. § 119, filed in the Korean Intellectual Property Office on Oct. 5, 2023, the entire contents of which are incorporated herein by reference.

BACKGROUND

1. Technical Field

The disclosure herein relates to a foldable window having improved visibility and folding characteristics and a display device including the same.

2. Description of the Related Art

Display devices display various images on display screens and provide users with information. A display device displays information on a part of a screen.

Flexible display devices include a flexible display panel capable of being folded. Unlike rigid display devices, the flexible display devices may be folded, rolled, or bent for increased portability and improved user's convenience.

It is to be understood that this background of the technology section is, in part, intended to provide useful background for understanding the technology. However, this background of the technology section may also include ideas, concepts, or recognitions that were not part of what was appreciated by those skilled in the pertinent art prior to a corresponding effective filing date of the subject matter disclosed herein.

SUMMARY

Embodiments provide a window that has improved visibility and folding characteristics.

Embodiments also provide a display device including a window having improved visibility and folding characteristics.

An embodiment of the disclosure provides a display device according to an embodiment of the disclosure includes a folding area foldable around a virtual folding axis, and a non-folding area adjacent to the folding area, a display panel, and a window disposed on the display panel. The window includes a patterned glass including a patterned part having at least one groove pattern on a top surface of the patterned part, and corresponding to the folding area, and a non-patterned part adjacent to the patterned part and corresponding to the non-folding area, and a filling layer filled in the at least one groove pattern. The filling layer includes a first filling part in contact with the patterned part, and a second filling part in contact with the first filling part. A 1-1-th refractive index of the first filling part for light having a first wavelength is substantially equal to as a 2-1-th refractive index of the second filling part for the light having the first wavelength, and a 1-2-th refractive index of the first filling part for light having a second wavelength different from the first wavelength is different from a 2-2-th refractive index of the second filling part for the light having the second wavelength.

In an embodiment, a 3-1-th refractive index of the patterned glass for the light having the first wavelength may be substantially equal to each of the 1-1-th refractive index and the 2-1-th refractive index.

In an embodiment, a 3-2-th refractive index of the patterned glass for the light having the second wavelength may be different from each of the 1-2-th refractive index and the 2-2-th refractive index, and the 1-2-th refractive index may have a value between the 2-2-th refractive index and the 3-2-th refractive index.

In an embodiment, the 1-2-th refractive index may be less than the 2-2-th refractive index, and greater than the 3-2-th refractive index.

In an embodiment, the first wavelength may be in a range of about 500 nm to about 600 nm, and the second wavelength may be in a range of about 410 nm to about 500 nm, or in a range of about 600 nm to about 700 nm.

In an embodiment, the first wavelength may be in a range of about 570 nm to about 600 nm.

In an embodiment, a 1-3-th refractive index of the first filling part for light having a third wavelength which is different from each of the second wavelength and the first wavelength may be different from a 2-3-th refractive index of the second filling part for the light having the third wavelength.

In an embodiment, the first wavelength may be in a range of about 500 nm to about 600 nm, the second wavelength may be in a range of about 410 nm to about 500 nm, and the third wavelength may be in a range of about 600 nm to about 700 nm.

In an embodiment, the 1-3-th refractive index may have a value between the 2-3-th refractive index and a 3-3-th refractive index of the patterned glass for the light having the third wavelength.

In an embodiment, the filling layer may further include a third filling part that is in contact with the second filling part, and the first filling part, the second filling part, and the third filling part may be stacked in sequence from an inner surface of the at least one groove pattern.

In an embodiment, the second filling part may include at least one of a urethane-based resin, an epoxy-based resin, a polyester-based resin, a polyether-based resin, an acrylate-based resin, and an ABS resin.

In an embodiment, the at least one groove pattern may include a plurality of groove patterns, and the plurality of groove patterns may be spaced apart from each other.

In an embodiment, the virtual folding axis may extend in a first direction, the non-folding area may include a first non-folding area and a second non-folding area spaced apart from the first non-folding area in a second direction perpendicular to the first direction. The folding area may be disposed between the first non-folding area and the second non-folding area. The plurality of groove patterns may be arranged in the second direction.

In an embodiment, a lower groove pattern may be defined in a bottom surface of the patterned part, and the window may further include a lower filling layer filled in the lower groove pattern.

In an embodiment, the window may further include a window protective layer disposed on the patterned glass.

In an embodiment of the disclosure, a display device includes a folding area foldable around a virtual folding axis, and a non-folding area adjacent to the folding area, a display panel, and a window disposed on the display panel and satisfying Equation 1 below. The window includes a patterned glass including a patterned part having a groove pattern on a top surface of the patterned part, and corresponding to the folding area, and a non-patterned part adjacent to the patterned part and corresponding to the non-folding area, and a filling layer filled in the groove pattern. The filling layer includes a first filling part that is in contact with the patterned part, and a second filling part that is in contact with the first filling part.

$$\sqrt{n2 \times n3} - 0.005 < n1 < \sqrt{n2 \times n3} + 0.005 \quad \text{[Equation 1]}$$

In Equation 1, n1, n2, and n3 are refractive indexes of the first filling part, the second filling part, and the patterned glass, respectively, for first visible light.

In an embodiment, in Equation 1, n1, n2, and n3 may have different values from each other.

In an embodiment, in Equation 1, each of n1, n2, and n3 may have a value in a range of about 1.4 to about 1.6.

In an embodiment, in Equation 1, the first visible light may be red light or blue light.

In an embodiment of the disclosure, a window includes a patterned glass including a patterned part having a groove pattern on a top surface of the patterned part, at least a portion of the patterned part being foldable, and a non-patterned part adjacent to the patterned part, and a filling layer filled in the groove pattern. The filling layer includes a reflection preventing part that is in contact with the patterned part, and a resin part that is in contact with the reflection preventing part. A 1-1-th refractive index of the reflection preventing part for light having a first wavelength is substantially equal to as a 2-1-th refractive index of the resin part for the light having the first wavelength, and a 1-2-th refractive index of the reflection preventing part for light having a second wavelength is different from a 2-2-th refractive index of the resin part for the light having the second wavelength. The first wavelength is different from the second wavelength.

BRIEF DESCRIPTION OF THE DRAWINGS

An additional appreciation according to the embodiments of the disclosure will become more apparent by describing in detail the embodiments thereof with reference to the accompanying drawings, wherein:

FIG. 6A is a schematic cross-sectional view illustrating a portion of a cross-section of a window according to an embodiment of the disclosure; and FIG. 6B is a schematic cross-sectional view illustrating a portion of a cross-section of a window according to another embodiment of the disclosure.

DETAILED DESCRIPTION OF THE EMBODIMENTS

Figure 1:
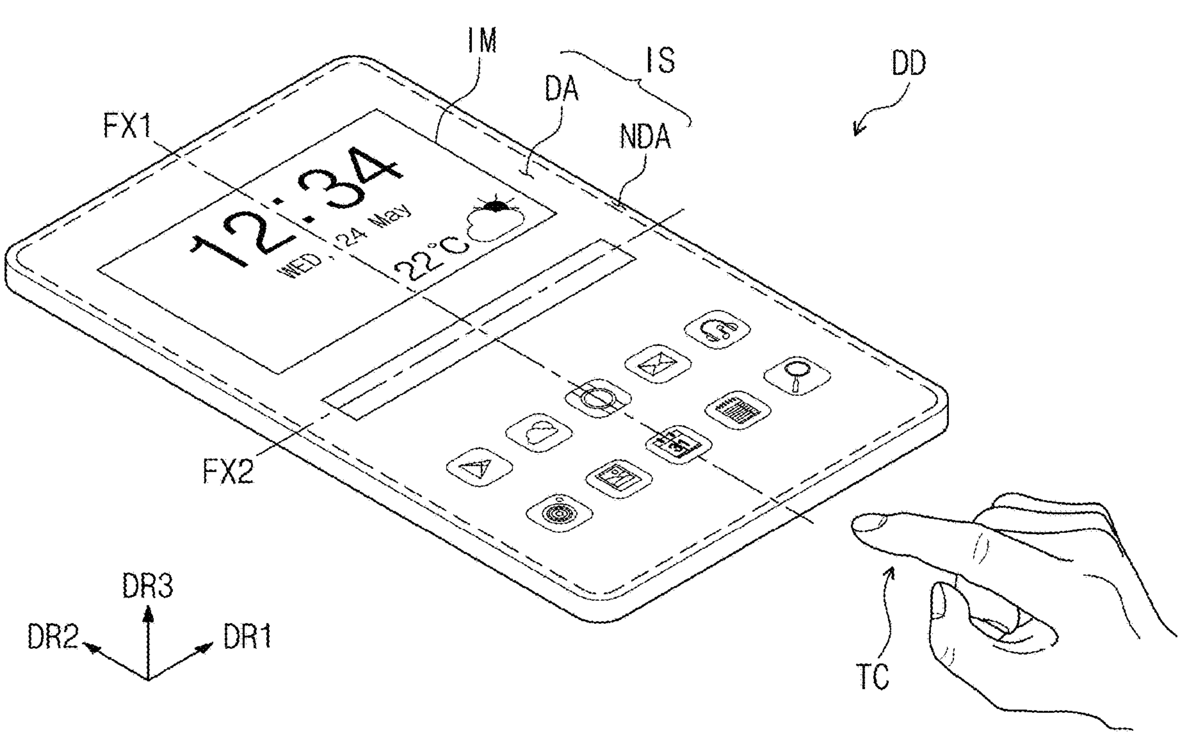
FIG. 1 is a schematic perspective view of a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

When an element, such as a layer, is referred to as being "on", "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

Although the terms "first", "second", etc. may be used herein to describe various elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the disclosure. Further, the blocks, units, and/or modules of some embodiments may be physically combined into more complex blocks, units, and/or modules without departing from the scope of the disclosure.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, embodiments of the disclosure will be described with reference to the accompanying drawings.

FIG. 1 is a schematic perspective view of a display device according to an embodiment of the disclosure.

Referring to FIG. 1, a display device DD may be activated in response to an electrical signal. For example, the display device DD may display an image by the electrical signal. The display device DD may include various embodiments. For example, the display device DD may be used in large-sized electronic devices such as televisions, monitors, outdoor billboards, or the like. For example, the display device DD may be used in small and medium-sized electronic devices such as personal computers, notebook computers, personal digital assistants, vehicle navigation devices, game consoles, smartphones, portable electronic devices, cameras, or the like. In this embodiment, a smartphone is illustrated as an example of the display device DD.

The display device DD may have a rectangular shape with short sides in a first direction DR1 and long sides in a second direction DR2 intersecting (e.g., crossing) the first direction DR1. However, the shape of the display device DD is not limited thereto, and the display device DD may have various shapes.

The display device DD may be a foldable display device. For example, the display device DD according to an embodiment of the disclosure may be folded (or foldable) around (or about) a folding axis extending in a direction (e.g., a predetermined or selectable direction). Hereinafter, a state in which the display device DD is not folded and flat is defined as a first state (e.g., a non-folded state or a spread state), and a state in which the display device DD is folded around the folding axis is defined as a second state (e.g., a folded state). The folding axis may be a rotary axis formed by folding of the display device DD. The folding axis may be defined by a mechanical structure of the display device DD. For example, two parts of the mechanical structure of the display device DD may be inclined at an angle to form the folding axis between the inclined parts.

The folding axis may extend in the first direction DR1 or in the second direction DR2. In an embodiment of the disclosure, the folding axis extending in the second direction DR2 may be defined as a first folding axis FX1, and the folding axis extending in the first direction DR1 may be defined as a second folding axis FX2. The display device DD may include one of the first and second folding axes FX1 and FX2. For example, the display device DD may be folded in one of the first and second folding axes FX1 and FX2.

As illustrated in FIG. 1, the display device DD may display an image IM on a display surface IS parallel to each of the first direction DR1 and the second direction DR2. For example, the display surface IS may have sides parallel to the first direction DR1 and sides parallel to the second direction DR2. The display surface IS on which the image IM is displayed may correspond to a front surface of the display device DD. A direction intersecting (e.g., perpendicular to) the display surface IS, e.g., a thickness direction of the display device DD, may be referred to as a third direction DR3. The display device DD may display the image IM in the third direction DR3.

The display surface IS of the display device DD may be divided into multiple areas. A display area DA and a non-display area NDA may be defined on the display surface IS of the display device DD.

The display area DA may be an area on which an image IM is displayed, and the image IM may be displayed through the display area DA. The display area DA may have a rectangular shape. The non-display area NDA may be an area adjacent to the display area DA. The image IM may not be displayed on the non-display area NDA. A bezel area of the display device DD may be defined by the non-display area NDA. In an embodiment of the disclosure, the non-display area NDA may be adjacent to the display area DA. For example, the non-display area NDA may surround the display area DA. Accordingly, the shape of the display area DA may be defined substantially by the non-display area NDA. However, this is illustrated as an example. For example, the non-display area NDA may be disposed adjacent to a side (e.g., only one side) of the display area DA. In other embodiments, the non-display area NDA may be omitted.

The display device DD according to an embodiment of the disclosure may detect a user's input TC applied from the outside. The user's input TC may include various types of external inputs such as a part of a user's body, light, heat, pressure, or the like. In this embodiment, the user's input TC is illustrated as the user's hand (e.g., a finger) applied to the front surface of the display device. However, this is illustrated as an example. For example, the user's input TC may be provided in various types as described above, and the display device DD may also detect the user's input TC applied to a side surface or a rear surface of the display device DD according to a structure of the display device DD. However, the disclosure is not limited thereto.

The display device DD may activate the display surface IS and display the image IM. The display device DD may also detect the user's input TC. In this embodiment, an area in which the user's input TC is detected may be provided in the display area DA on which the image IM is displayed. However, this is illustrated as an example. For example, the area which detects the user's input TC may be provided on the non-display area NDA. For example, the user's input TC may be detected in the non-display area NDA. In other embodiments, the area which detects the user's input TC may be provided on an entire area of the display surface IS. For example, the user's input TC may be detected in the entire area of the display surface IS.

FIGS. 2A to 2D are schematic views illustrating a folded state of the display device illustrated in FIG. 1.

Figure 2A:
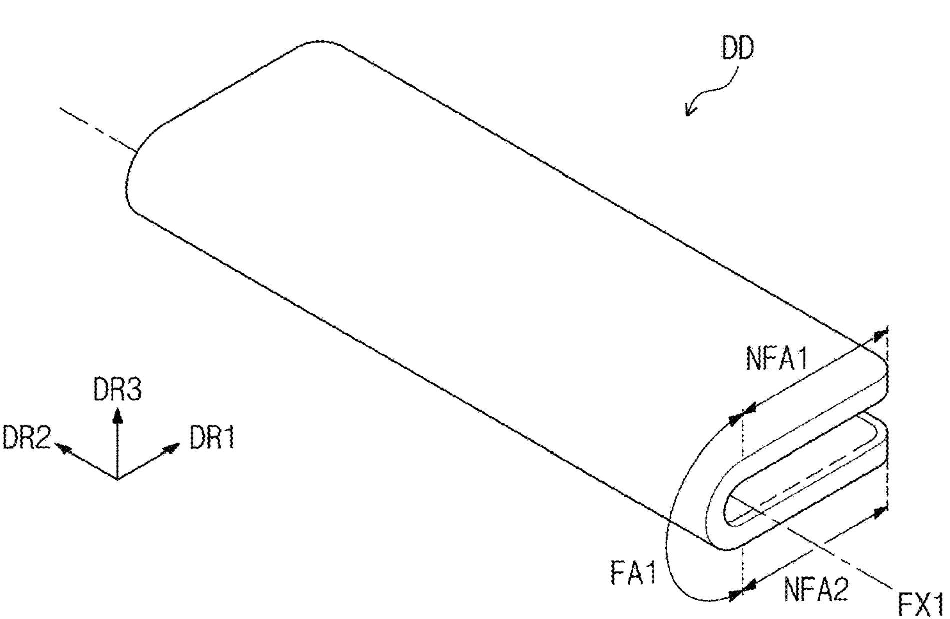
FIGS. 2A to 2D are schematic views illustrating a folded state of the display device illustrated in FIG. 1.
Figure 2B:
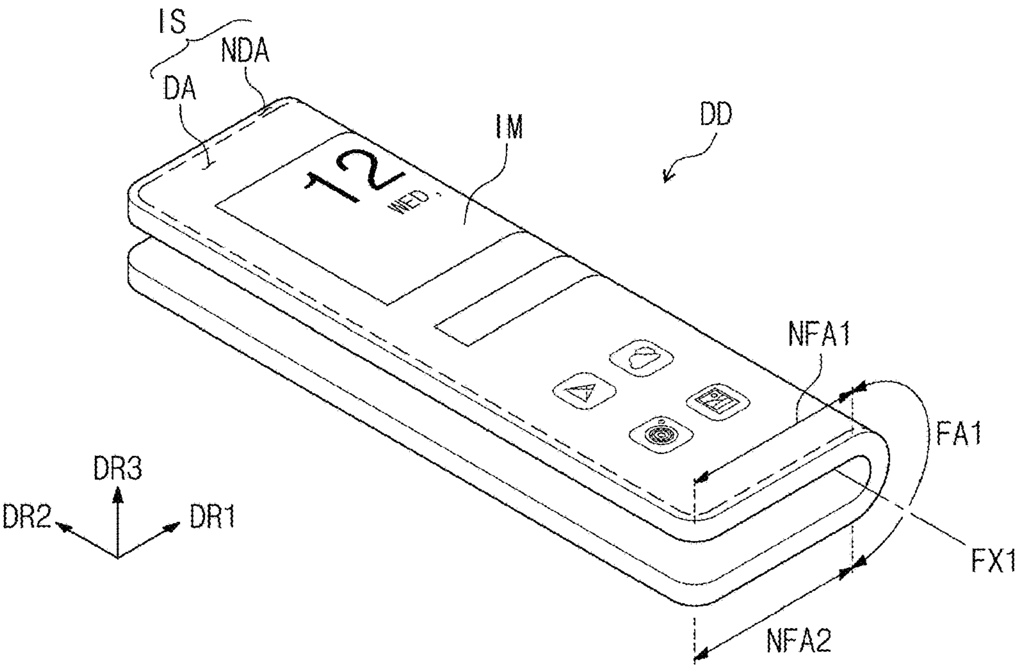

FIG. 2A is a perspective view illustrating a state in which the display device DD illustrated in FIG. 1 is in-folded around the first folding axis FX1. FIG. 2B is a perspective view illustrating a state in which the display device DD illustrated in FIG. 1 is out-folded around the first folding axis FX1.

Figure 2C:
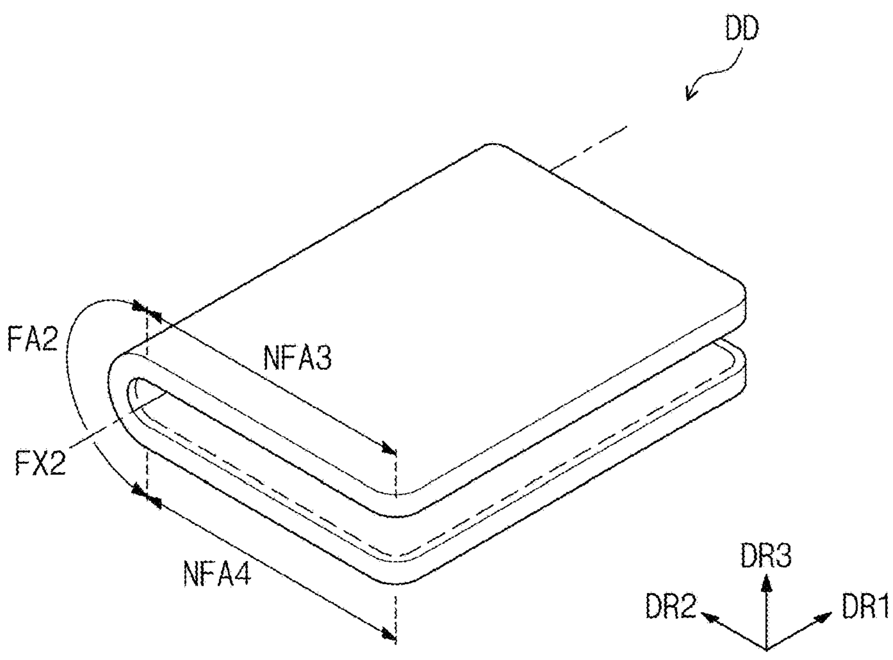
Figure 2D:
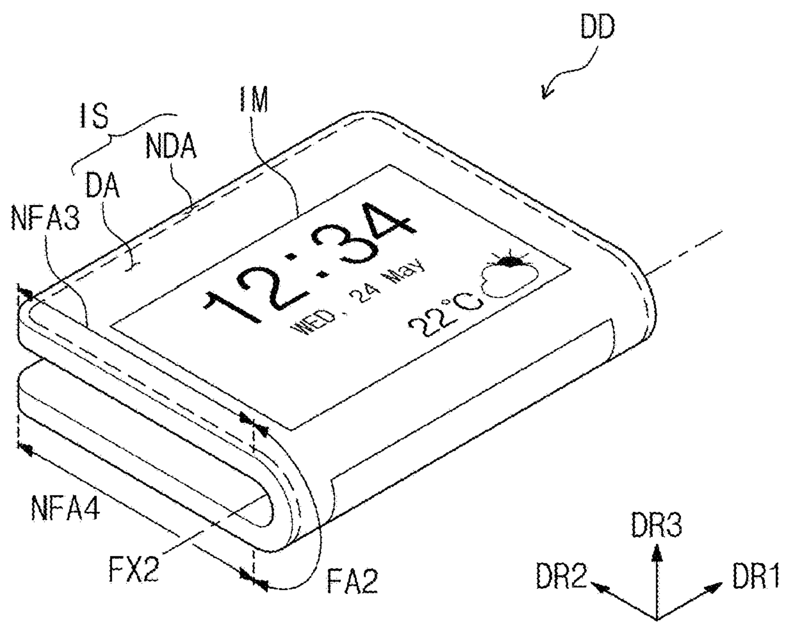

FIG. 2C is a perspective view illustrating a state in which the display device DD illustrated in FIG. 1 is in-folded around the second folding axis FX2. FIG. 2D is a perspective view illustrating a state in which the display device DD illustrated in FIG. 1 is out-folded around the second folding axis FX2.

Referring to FIGS. 2A to 2D, the display device DD may be a foldable display device. The display device DD may be folded around a folding axis extending in a direction (e.g., a predetermined or selectable direction). For example, the display device DD may be folded around the first folding axis FX1 or the second folding axis FX2.

Referring to FIGS. 2A and 2B, according to an operation type, multiple areas may be defined in the display device DD. The areas may be divided into a folding area FA1 and at least one non-folding area NFA1 and NFA2. The folding area FA1 may be defined between the two non-folding areas NFA1 and NFA2.

The folding area FA1 may be an area in which the display device DD is folded around the first folding axis FX1. The folding area FA1 may substantially form a curvature. The first folding axis FX1 may extend in the second direction DR2, e.g., in a long axis direction of the display device DD. The folding area FA1 may be defined as an area folded around the first folding axis FX1 and extending in the second direction DR2.

In an embodiment of the disclosure, the non-folding areas NFA1 and NFA2 may include a first non-folding area NFA1 and a second non-folding area NFA2. The first non-folding area NFA1 may be adjacent to a side of the folding area FA1 in the first direction DR1, and the second non-folding area NFA2 may be adjacent to another side of the folding area FA1 in the first direction DR1.

The display device DD may be in-folded or out-folded. In an in-folding operation, display surfaces of different non-folding areas NFA1 and NFA2 may face each other. In an out-folding operation, each of the display surfaces of the different non-folding areas NFA1 and NFA2 may face the outside of the display device DD.

For example, in the in-folding operation, portions of the display surface IS may face each other. In the out-folding operation, portions of the rear surface of the display device DD may face each other.

The display device DD illustrated in FIG. 2A may be in-folded, and the display surface IS (e.g., refer to FIG. 1) on the first non-folding area NFA1 and the display surface IS (e.g., refer to FIG. 1) on the second non-folding area NFA2 may face each other. In case that the first non-folding area NFA1 rotates around the first folding axis FX1 in a clockwise direction, the display device DD may be in-folded. The first folding axis FX1 may be defined at a center of the display device DD in the first direction DR1, and the first non-folding area NFA1 and the second non-folding area NFA2 may be aligned to in-fold the display device DD1.

Referring to FIG. 2B, the display device DD may be out-folded around the first folding axis FX1. The display device DD may display the image IM in case that the display surface of the first non-folding area NFA1 and the display surface of the second non-folding area NFA2 are exposed to the outside. The image IM may be displayed also on the display surface of the folding area FA1 exposed to the outside. As illustrated in FIG. 1, the display device DD may display the image IM in a spread state (or a non-folded state). The first non-folding area NFA1, the second non-folding area NFA2, and the folding area FA may display images, which provide pieces of information independent of each other, respectively. In other embodiments, portions of an image, which provides a piece of information may be displayed on the folding area FA.

The display device DD may have the in-folded state and the out-folded state. For example, the display device DD may include both the in-folded state and the out-folded state. In other embodiments, the display device DD may be manufactured to have one of the in-folded state and the out-folded state.

Referring to FIGS. 2C and 2D, the display device DD may be in-folded or out-folded around the second folding axis FX2. The second folding axis FX2 may extend in the first direction DR1, e.g., in a short axis direction of the display device DD.

According to an operation type, multiple areas may be defined in the display device DD. The areas may be divided into a folding area FA2 and at least one non-folding area NFA3 and NFA4. The folding area FA2 may be defined between the two non-folding areas NFA3 and NFA4.

The folding area FA2 may be an area in which the display device DD is folded around the second folding axis FX2. The folding area FA2 may substantially form a curvature. The folding area FA2 may be defined as an area folded around the second folding axis FX2 and extending in the first direction DR1.

In an embodiment of the disclosure, the non-folding areas NFA3 and NFA4 may include a first non-folding area NFA3 and a second non-folding area NFA4. The first non-folding area NFA3 may be adjacent to a side of the folding area FA2 in the second direction DR2, and the second non-folding area NFA4 may be adjacent to another side of the folding area FA2 in the second direction DR2.

Figure 3A:
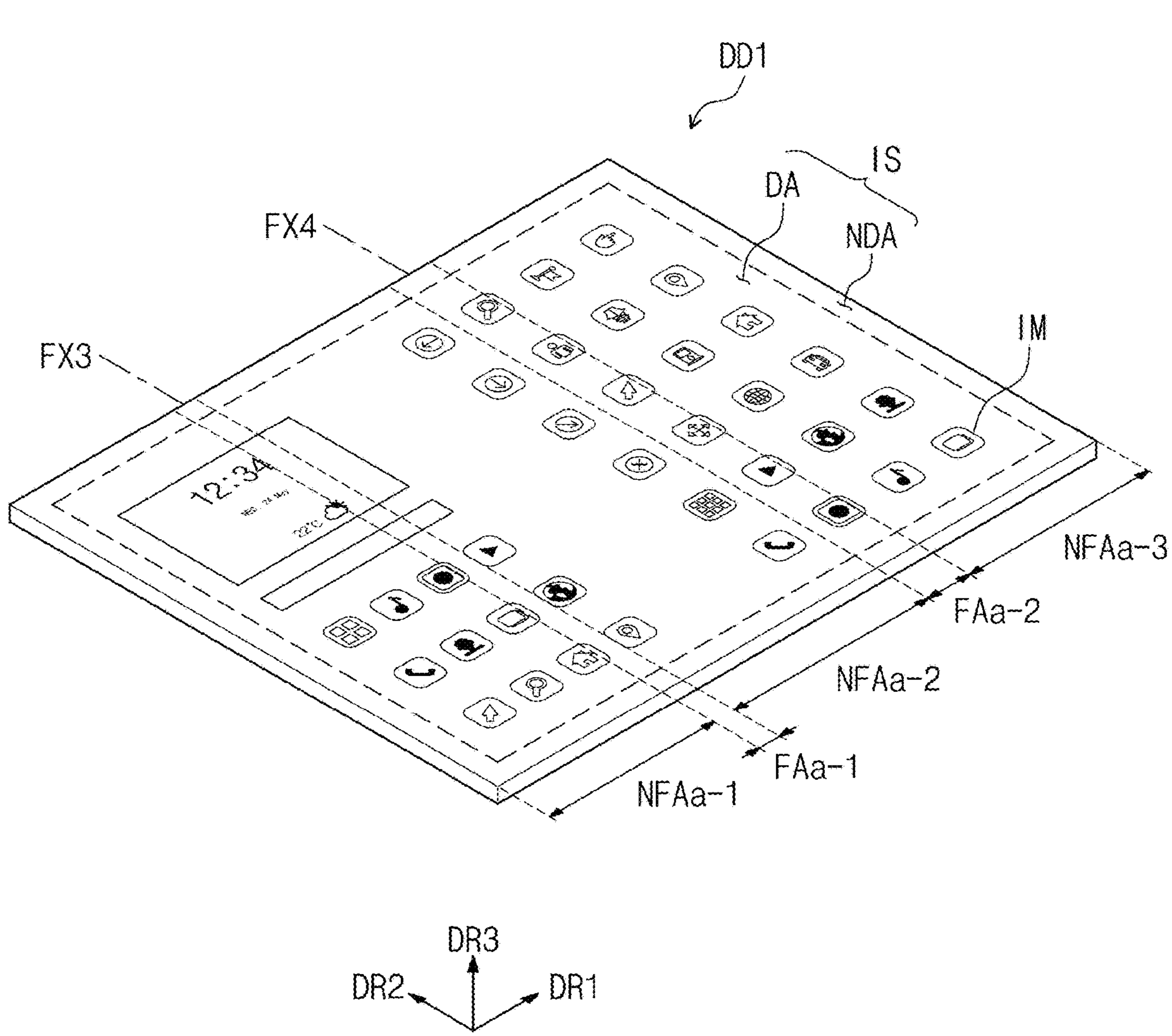
FIG. 3A is a schematic perspective view of a spread state of a display device according to an embodiment of the disclosure.
Figure 3B:
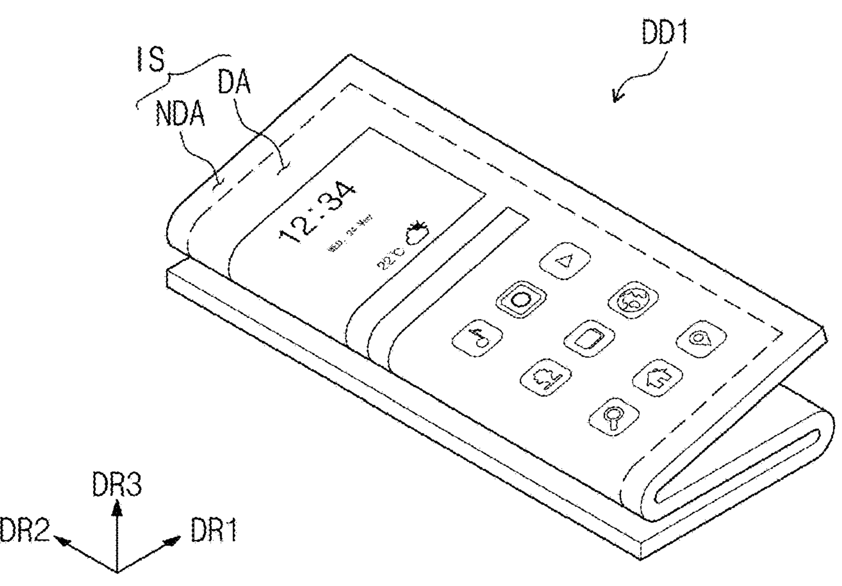
FIGS. 3B and 3C are schematic views illustrating a folded state of the display device illustrated in FIG. 3A.
Figure 3C:
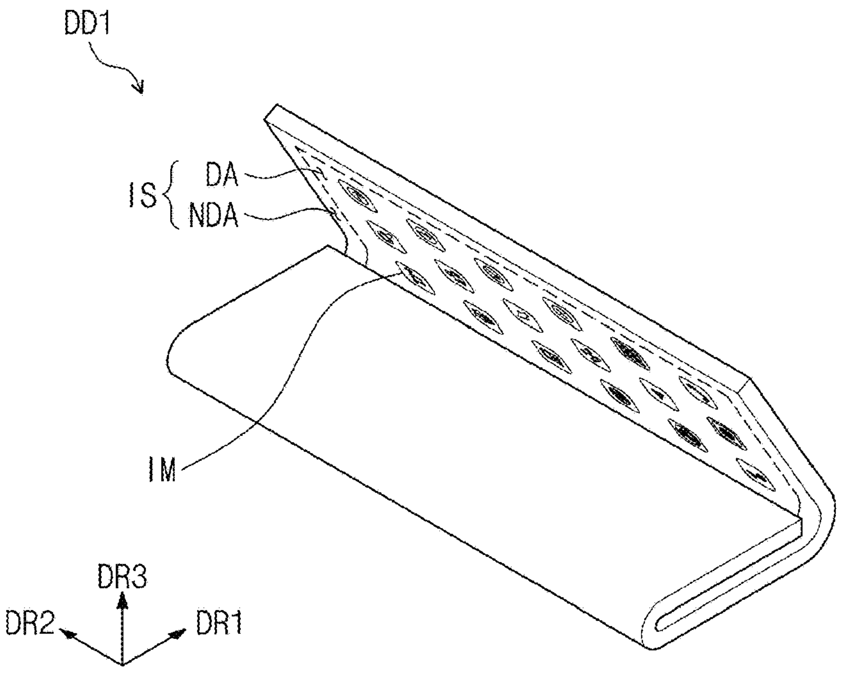

FIG. 3A is a schematic perspective view of a spread state of a display device according to an embodiment of the disclosure. FIGS. 3B and 3C are schematic views illustrating a multi-folded state of the display device illustrated in FIG. 3A.

Referring to FIGS. 3A to 3C, a display device DD1 may be a foldable display device. Folding areas may be defined in the display device DD1. The display device DD1 may include folding areas FAa-1 and FAa-2 and non-folding areas NFAa-1, NFAa-2, and NFAa-3. In an embodiment of the disclosure, the display device DD1 may include a first folding area FAa-1, a second folding area FAa-2, a first non-folding area NFAa-1, a second non-folding area NFAa-2, and a third non-folding area NFAa-3. The first folding area FAa-1 may be disposed between the first non-folding area NFAa-1 and the second non-folding area NFAa-2, and the second folding area FAa-2 may be disposed between the second non-folding area NFAa-2 and the third non-folding area NFAa-3 in the first direction DR1. Although the two folding areas FAa-1 and FAa-2 and the three non-folding areas NFAa-1, NFAa-2, and NFAa-3 are illustrated as an example, the number of the folding areas FAa-1 and FAa-2 and the number of the non-folding areas NFAa-1, NFAa-2, and NFAa-3 are not limited thereto, and may have various numbers.

Referring to FIGS. 3A and 3B, the first folding area FAa-1 may be folded around a third folding axis FX3 parallel to the second direction DR2. The first folding area FAa-1 may be inner-folded and a display surface of the second non-folding area NFAa-2 and a display surface of the first non-folding area NFAa-1 may face each other. The second folding area FAa-2 may be folded around a fourth folding axis FX4 parallel to the second direction DR2. The second folding area FAa-2 may be outer-folded and a rear surface of the second non-folding area NFAa-2 and a rear surface of the third non-folding area NFAa-3 may face each other, and a display surface of the third non-folding area NFAa-3 may face the outside.

Referring to FIGS. 3A and 3C, the first folding area FAa-1 may be folded around the third folding axis FX3 parallel to the second direction DR2. The first folding area FAa-1 may be inner-folded and the display surface of the first non-folding area NFAa-1 may be disposed in the inside of the folded display device DD1, and the display surface of the second non-folding area NFAa-2 and the display surface of the first non-folding area NFAa-1 may face each other. The second folding area FAa-2 may be folded around the fourth folding axis FX4 parallel to the second direction DR2. The second folding area FAa-2 may be inner-folded and a rear surface of the first non-folding area NFAa-1 and a display surface of the third non-folding area NFAa-3 may face each other.

In an embodiment of the disclosure, the outer-folding operation and the inner-folding operation may be performed at the same time. For example, only one of the outer-folding operation and the inner-folding operation may occur.

The multi-folded states of the display device DD1 are illustrated in FIGS. 3B and 3C, but an embodiment of the disclosure is not limited thereto. For example, the display device DD1 may have various folding shapes.

Figure 4:
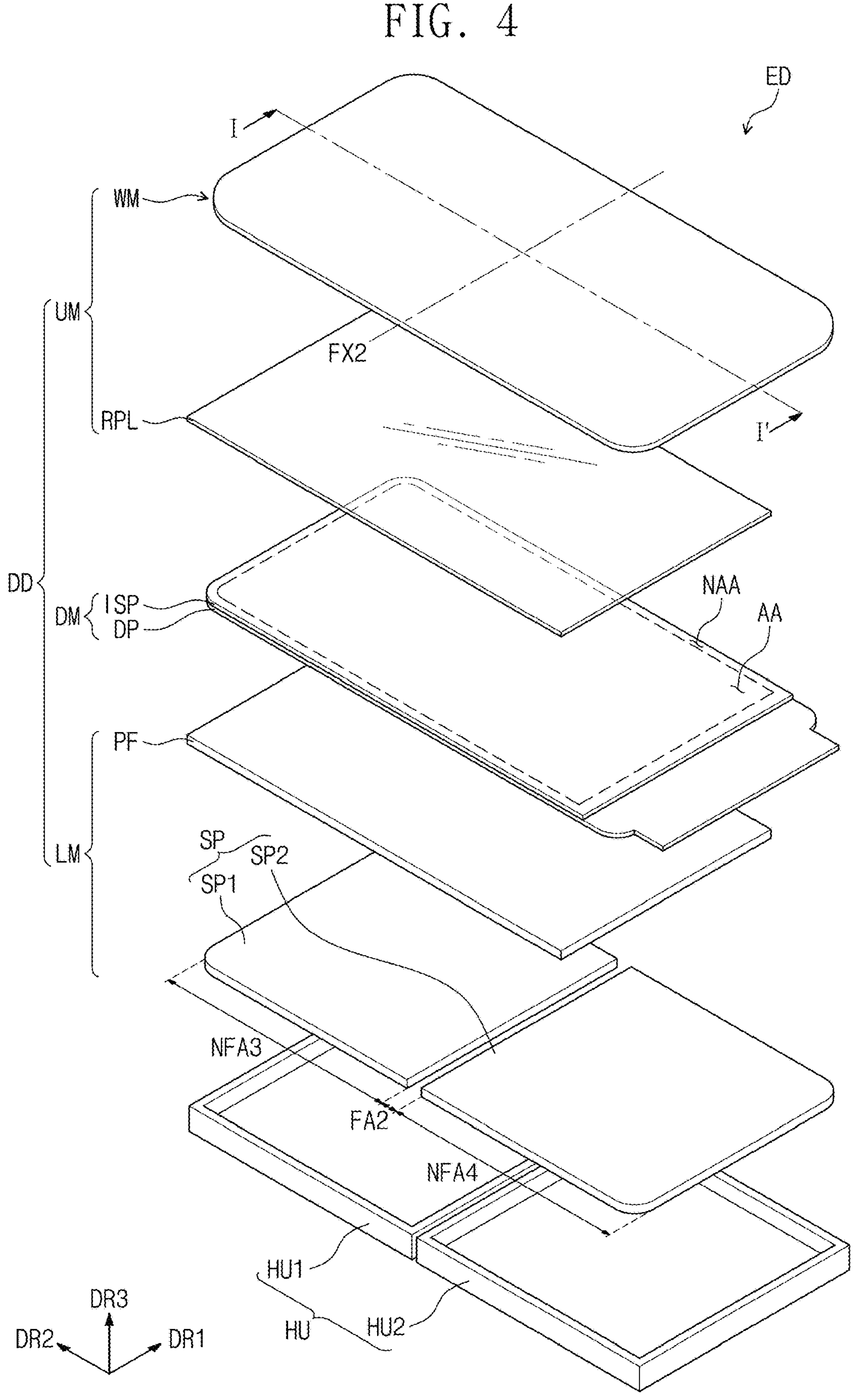
FIG. 4 is a schematic exploded perspective view of an electronic device according to an embodiment of the disclosure.
Figure 5A:
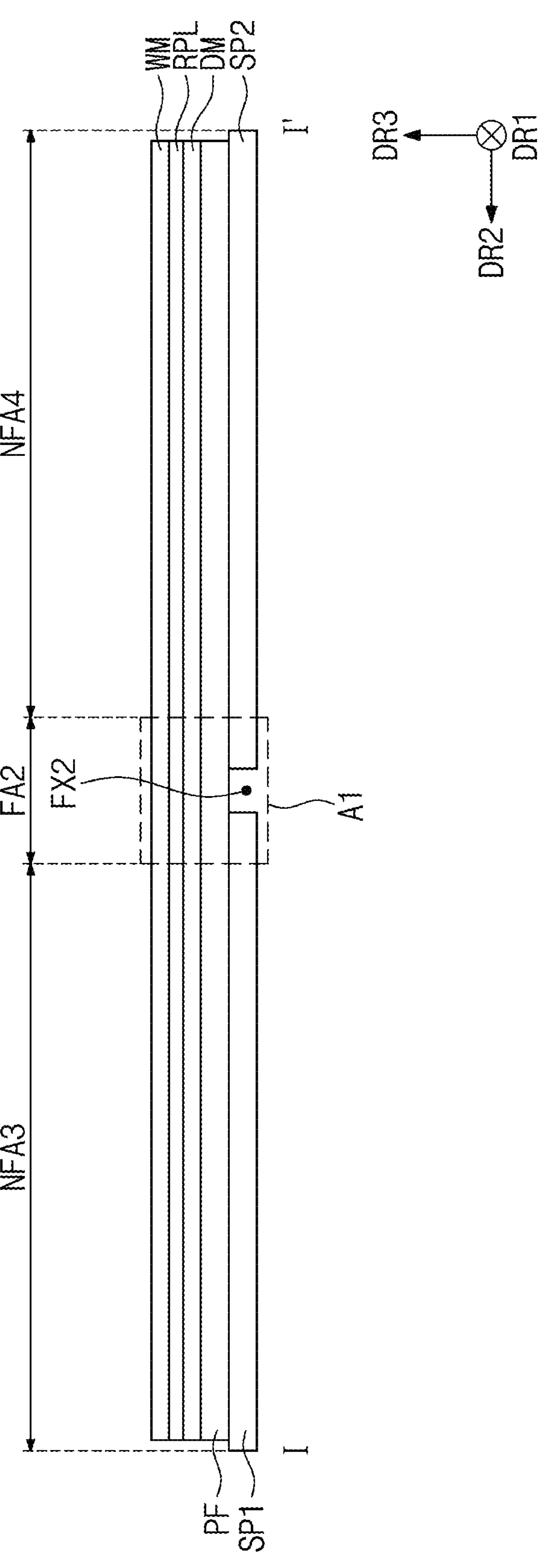
FIG. 5A is a schematic cross-sectional view of the display device taken along line I-I illustrated in FIG. 4.
Figure 5B:
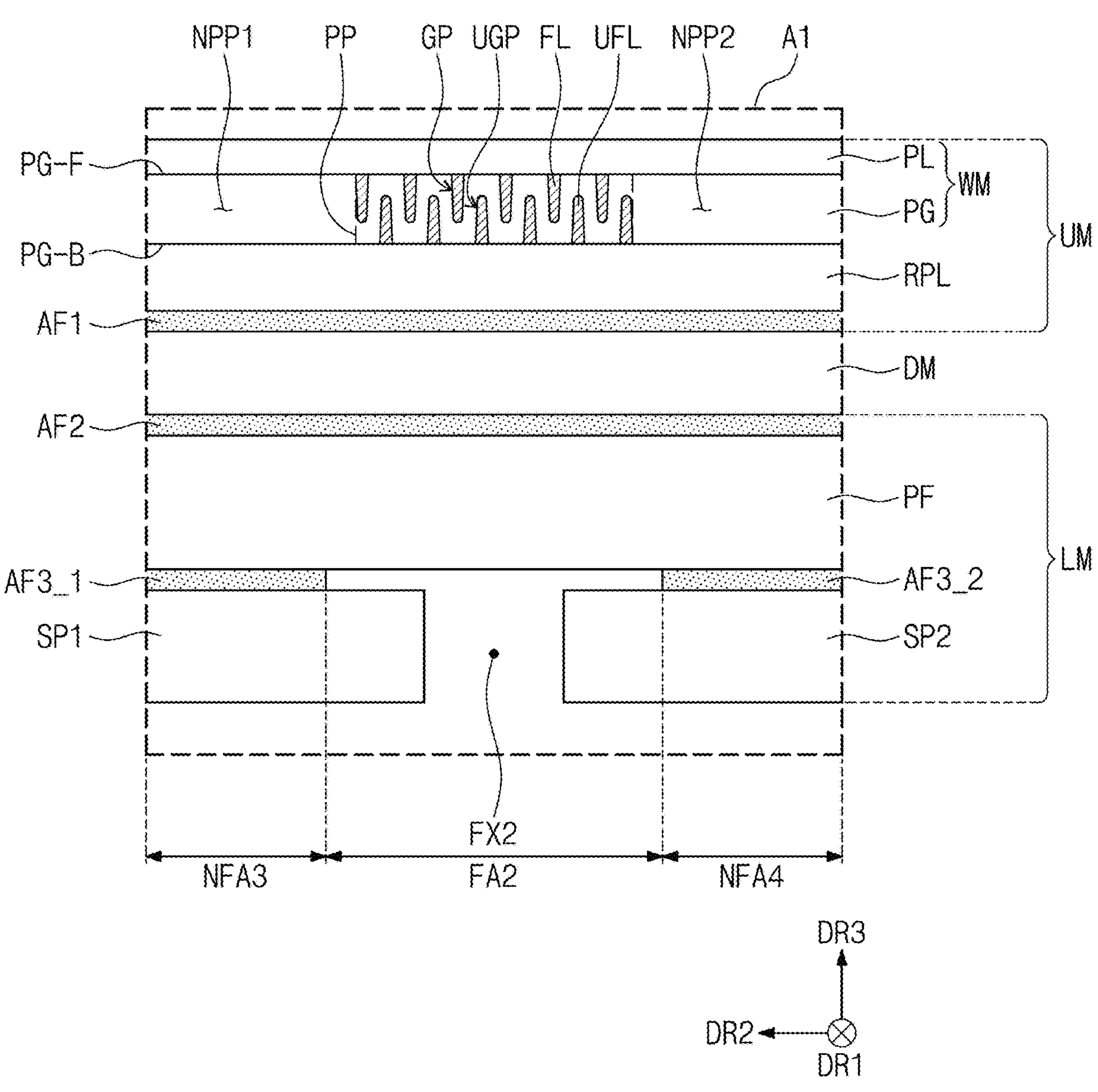
FIG. 5B is a schematic enlarged cross-sectional view of portion A1 illustrated in FIG. 5A.

FIG. 4 is a schematic exploded perspective view of an electronic device according to an embodiment of the disclosure. FIG. 5A is a schematic cross-sectional view of the display device taken along line I-I' illustrated in FIG. 4. FIG. 5B is a schematic enlarged cross-sectional view of portion A1 illustrated in FIG. 5A.

Referring to FIGS. 4, 5A, and 5B, an electronic device ED according to an embodiment of the disclosure may include a display device DD and a housing HU. Although not illustrated, the electronic device ED may include a mechanical structure (or a hinge structure) for controlling a folding operation (or a bending operation) of the display device DD.

The display device DD according to an embodiment of the disclosure may include a display module DM that displays an image, an upper module UM disposed on the display module DM, and a lower module LM disposed below the display module DM. The display module DM may constitute a part of the display device DD. For example, the image may be generated by the display module DM.

The display module DM may include a display panel DP and an input sensing part ISP. The display panel DP according to an embodiment of the disclosure may be a light emitting display panel. However, the disclosure is not limited thereto. For example, the display panel DP may be an organic light emitting display panel, an inorganic light emitting display panel, a quantum-dot light emitting display panel, or the like. An emission layer of the organic light emitting display panel may include an organic light emitting material, and an emission layer of the inorganic light emitting display panel may include an inorganic light emitting material. An emission layer of the quantum-dot light emitting display panel may include a quantum dot, a quantum rod, and the like. Hereinafter, the display panel DP is described as the organic light emitting display panel.

The display panel DP may be a foldable display panel. Accordingly, the display panel DP may be rolled as a whole, or may be folded or unfolded around a folding axis FX2.

The input sensing part ISP may be disposed on (e.g., be directly disposed on) the display panel DP. According to an embodiment of the disclosure, the input sensing part ISP may be formed on the display panel DP through a continuous process. For example, in case that the input sensing part ISP is disposed on (e.g., be directly disposed on) the display panel DP, an adhesive film may not be disposed between the input sensing part ISP and the display panel DP. However, an embodiment of the disclosure is not limited thereto. For example, an adhesive film may be disposed between the input sensing part ISP and the display panel DP. The input sensing part ISP and the display panel DP may not be manufactured in a continuous process, and after the input sensing part ISP and the display panel DP are manufactured in separate processes, the input sensing part ISP may be fixed to a top surface of the display panel DP through an adhesive film.

The display panel DP may generate an image, and the input sensing part ISP may acquire (or sense) coordinate information of a user's input (e.g., touch event).

The upper member UM may include a window WM disposed on the display module DM. The window WM may include an optically transparent insulation material. Accordingly, the image generated by the display module DM may pass through the window WM and may be readily recognized by the user. The window WM may include a patterned glass PG, a filling layer FL, a lower filling layer UFL, and a window protective layer PL.

The patterned glass PG may include a glass material. The patterned glass PG may include a patterned part PP and non-patterned parts NPP1 and NPP2. The patterned part PP may be a portion corresponding to the folding area FA2, and the non-patterned parts NPP1 and NPP2 may be portions corresponding to the first and second non-folding areas NFA3 and NFA4. The non-patterned parts NPP1 and NPP2 may include a first non-patterned part NPP1 corresponding to the first non-folding area NFA3, and a second non-patterned part NPP2 corresponding to the second non-folding area NFA4. The patterned part PP may be disposed between the first and second non-patterned parts NPP1 and NPP2.

The patterned glass PG may include a top surface PG-F and a bottom surface PG-B. The top surface PG-F and the bottom surface PG-B may be two surfaces of the patterned glass PG, and the top surface PG-F and the bottom surface PG-B may be opposite to each other. For example, the top surface PG-F and the bottom surface PG-B may be two surfaces facing each other in the third direction DR3. A surface of the patterned glass PG adjacent to a reflection preventing layer RPL (or adjacent to the display module DM) in the third direction DR3 may be the bottom surface PG-B. A surface of the patterned glass PG adjacent to the window protective layer PL may be the top surface PG-F.

The patterned part PP may include groove patterns GP and lower groove patterns UGP. For example, the groove patterns GP may be provided in the top surface PG-F of the patterned glass PG, and the lower groove patterns UGP may be provided in the bottom surface PG-B of the patterned glass PG. Each of the groove patterns GP may have a shape recessed from the top surface PG-F of the patterned glass PG. Each of the lower groove patterns UGP may have a shape recessed from the bottom surface PG-B of the patterned glass PG.

In an embodiment of the disclosure, in case that the folding axis FX2 extends in the first direction DR1, the groove patterns GP may be spaced apart from each other in the second direction DR2, and the lower groove patterns UGP may be spaced apart from each other in the second direction DR2. For example, in case that the folding axis FX2 extends in the second direction DR2, the groove patterns GP may be spaced apart from each other in the first direction DR1, and the lower groove patterns UGP may be spaced apart from each other in the first direction DR1.

The groove patterns GP and the lower groove patterns UGP may be filled with the filling layer FL and the lower filling layer UFL, respectively. The filling layer FL may fill the groove patterns GP, and the lower filling layer UFL may fill the lower groove patterns UGP. For example, recessed spaces defined by the groove patterns GP may be filled with the filling layer FL, and recessed spaces defined by the lower groove patterns UGP may be filled with the lower filling layer UFL. Accordingly, the window WM may have a flat surface due to the filling layer FL and the lower filling layer UFL. In an embodiment of the disclosure, the filling layer FL and the lower filling layer UFL may be provided only in the patterned part PP, and may not be provided in the first and second non-patterned parts NPP1 and NPP2.

The window WM may further include the window protective layer PL. The window protective layer PL may be provided on the patterned glass PG. The window protective layer PL may be provided on the filling layer FL. The window protective layer PL may protect the patterned glass PG from an external impact. The window protective layer PL may include a synthetic resin material. In an embodiment of the disclosure, the window protective layer PL may include at least one selected from a urethane-based resin, an epoxy-based resin, a polyester-based resin, a polyether-based resin, an acrylate-based resin, an acrylonitrile-butadiene-styrene resin (ABS resin), and rubber. For example, the window protective layer PL may include at least one of phenylene, polyethylene terephthalate (PET), polyimide (PI), polyamide (PAI), polyethylene naphthalate (PEN), or polycarbonate (PC). However, the disclosure is not limited thereto, and the window protective layer PL may include various materials.

Although not illustrated in the drawings, the window WM may further include a first window adhesive layer and a second window adhesive layer. The first window adhesive layer may be disposed between the patterned glass PG and the window protective layer PL and attach the window protective layer PL to the patterned glass PG. The second window adhesive layer may attach a member disposed below the window WM to the window WM. Each of the first window adhesive layer and the second window adhesive layer may include an optically transparent adhesive material. For example, each of the first window adhesive layer and the second window adhesive layer may include at least one of a pressure sensitive adhesive (PSA), an optical clear adhesive (OCA), and an optical clear resin (OCR). However, the disclosure is not limited thereto, and the first window adhesive layer and the second window adhesive layer may include various materials.

The window WM may be folded or unfolded around the folding axis FX2. For example, in case that a shape of the display module DM is changed, a shape of the window WM may be changed together. The window WM may transmit the image from the display module DM, and reduce an external impact. Thus, the window WM may prevent the display module DM from being damaged or malfunctioning due to the external impact. The external impact may be a force from the outside that may be expressed as a pressure or a stress. For example, the window WM may protect the display module DM from a force that causes a defect in the display module DM.

The upper module UM may further include at least one functional layer disposed between the display module DM and the window WM. In an embodiment of the disclosure, the functional layer may be the reflection preventing layer RPL that blocks reflection of external light.

The reflection preventing layer RPL may prevent elements of the display module DM from being visible from the outside by external light incident into the display device DD through a front surface of the display device DD. The reflection preventing layer RPL may include a retarder and a polarizer. The retarder may be a film type retarder or a liquid crystal coating type retarder. For example, the retarder may include a λ/2 retarder and/or a λ/4 retarder. The polarizer may also be a film type polarizer or a liquid crystal coating type polarizer. Each of the film type retarder and the film type polarizer may include a stretchable synthetic resin film, and each of the liquid crystal coating type retarder and the liquid crystal coating type polarizer may include liquid crystals arranged in an arrangement (e.g., a predetermined or selectable arrangement). The retarder and the polarizer may be provided as a single polarizing film. The functional layer may further include a protective film disposed on or below the reflection preventing layer RPL.

The upper module UM may further include a first adhesive film AF1 provided between the reflection preventing layer RPL and the display module DM. The first adhesive film AF1 may include an optically transparent adhesive material. In an embodiment of the disclosure, the first adhesive film AF1 may include a pressure sensitive adhesive (PSA), an optical clear adhesive (OCA), an optical clear resin (OCR), or the like. However, the disclosure is not limited thereto.

The display module DM may display an image in response to an electrical signal, and transmit/receive external input information. The display module DM may include an active area AA and a peripheral area NAA. The active area AA may be defined as an area onto which an image provided by the display module DM is projected.

The peripheral area NAA is adjacent to the active area AA. For example, the peripheral area NAA may be adjacent to the active area AA. In an embodiment, the peripheral area NAA may surround the active area AA. However, this is illustrated as an example, and the disclosure is not limited thereto. For example, the peripheral area NAA may have various shapes. According to an embodiment, the active area AA of the display module DM may correspond to at least a portion of the display area DA (e.g., refer to FIG. 1).

The lower module LM may include a support plate SP that is disposed on a rear surface of the display module DM and support the display module DM. The number of support plates of the support plate SP may be the same as the number of the non-folding areas NFA3 and NFA4. In an embodiment of the disclosure, the support plate SP may include a first support plate SP1, and a second support plate SP2 spaced apart from the first support plate SP1.

The first and second support plates SP1 and SP2 may correspond to the first and second non-folding areas NFA3 and NFA4, respectively. The first support plate SP1 may correspond to the first non-folding area NFA3 of the display module DM, and the second support plate SP2 may correspond to the second non-folding area NFA4 of the display module DM. Each of the first and second support plates SP1 and SP2 may include a metal material or a plastic material.

In case that the display module DM has a first state (e.g., a spread state or a non-folded state) of being flat, the first and second support plates SP1 and SP2 may be spaced apart from each other in the second direction DR2. In case that the display module DM has a second state (e.g., a folded state) of being folded around the folding axis FX2, the first and second support plates SP1 and SP2 may be spaced apart from each other in the third direction DR3.

The first and second support plates SP1 and SP2 may be spaced apart from each other in an area corresponding to the folding area FA2. Each of the first and second support plates SP1 and SP2 may overlap (e.g., partially overlap) the folding area FA2 in a plan view. For example, a spaced distance between the first and second support plates SP1 and SP2 may be less than a width of the folding area FA2 in the second direction DR2.

The support plate SP may further include a connecting module for connecting the first and second support plates SP1 and SP2. For example, the connecting module of the support plate SP may be extended from the first support plate SP1 to the second support plate SP2. The connecting module may include a hinge module or a multi-joint module.

The support plate SP may include the two support plates SP1 and SP2. However, an embodiment of the disclosure is not limited thereto. For example, in case that multiple folding axes FX2 are provided, the support plate SP may include support plates separated by the folding axes FX2. In other embodiments, the support plate SP may be provided in the form of one body without being separated into the first and second support plates SP1 and SP2. For example, the support plate SP may include the first and second support plates SP1 and SP2 integral with each other. A bending part may be provided on the support plate SP in an area corresponding to the folding area FA2. The bending part may have an opening passing through the support plate SP. For example, the bending part may have a groove recessed from a surface of the support plate SP.

The lower module LM may further include a protective film PF disposed between the display module DM and the support plate SP. The protective film PF may be a layer that is disposed below the display module DM and protects a rear surface of the display module DM. The protective film PF may include a synthetic resin film. The synthetic resin film of the protective film PF may include a polyimide film, a polyethylene terephthalate film, or the like. However, the disclosure is not limited thereto, and the protective film PF may have various materials.

The lower module LM may further include a second adhesive film AF2 and third adhesive films AF3_1 and AR3_2. The second adhesive film AF2 may be disposed between the protective film PF and the display module DM, and the third adhesive films AF3_1 and AF3_2 may be disposed between the protective film PF and the support plate SP. The protective film PF may be attached to the rear surface of the display module DM through the second adhesive film AF2. In an embodiment of the disclosure, the third adhesive films AF3_1 and AF3_2 may include a first sub-adhesive film AF3_1 and a second sub-adhesive film AF3_2. The first sub-adhesive film AF3_1 may be disposed between the first support plate SP1 and the protective film PF, and the second sub-adhesive film AF3_2 may be disposed between the second support plate SP2 and the protective film PF. The first and second sub-adhesive films AF3_1 and AF3_2 may be spaced apart from each other, and the folding area FA2 may be disposed between the first and second sub-adhesive films AF3_1 and AF3_2.

Each of the second and third adhesive films AF2, AF3_1 and AF3_2 may include an optically transparent adhesive material. In an embodiment of the disclosure, each of the second and third adhesive films AF2, AF3_1 and AF3_2 may include a pressure sensitive adhesive (PSA), an optical clear adhesive (OCA), an optical clear resin (OCR), or the like.

The housing HU may be coupled to (or extended to) the display device DD. For example, the housing HU may be coupled to (or extended to) the window WM. Thus, other modules described above (e.g., the display module DM, the lower module LM, and the like) may be accommodated in the housing HU. The housing HU may include first and second housings HU1 and HU2 separated from each other as illustrated. However, the disclosure is not limited thereto. Although not illustrated, the electronic device ED may further include a hinge structure for connecting the first and second housings HU1 and HU2.

Further description of a window WM according to an embodiment of the disclosure is provided below with reference to the accompanying drawings.

Figure 6A:
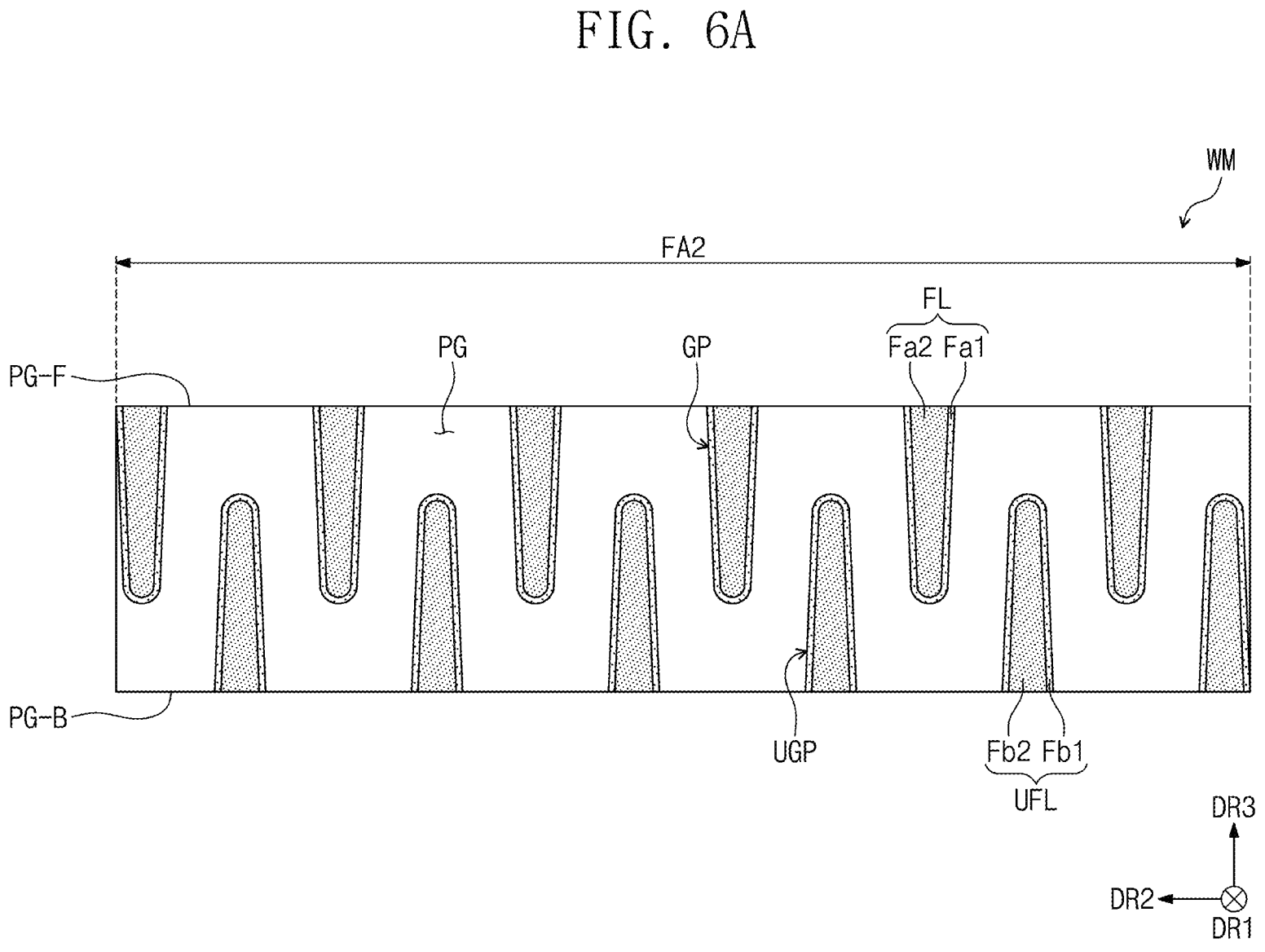
Figure 6B:
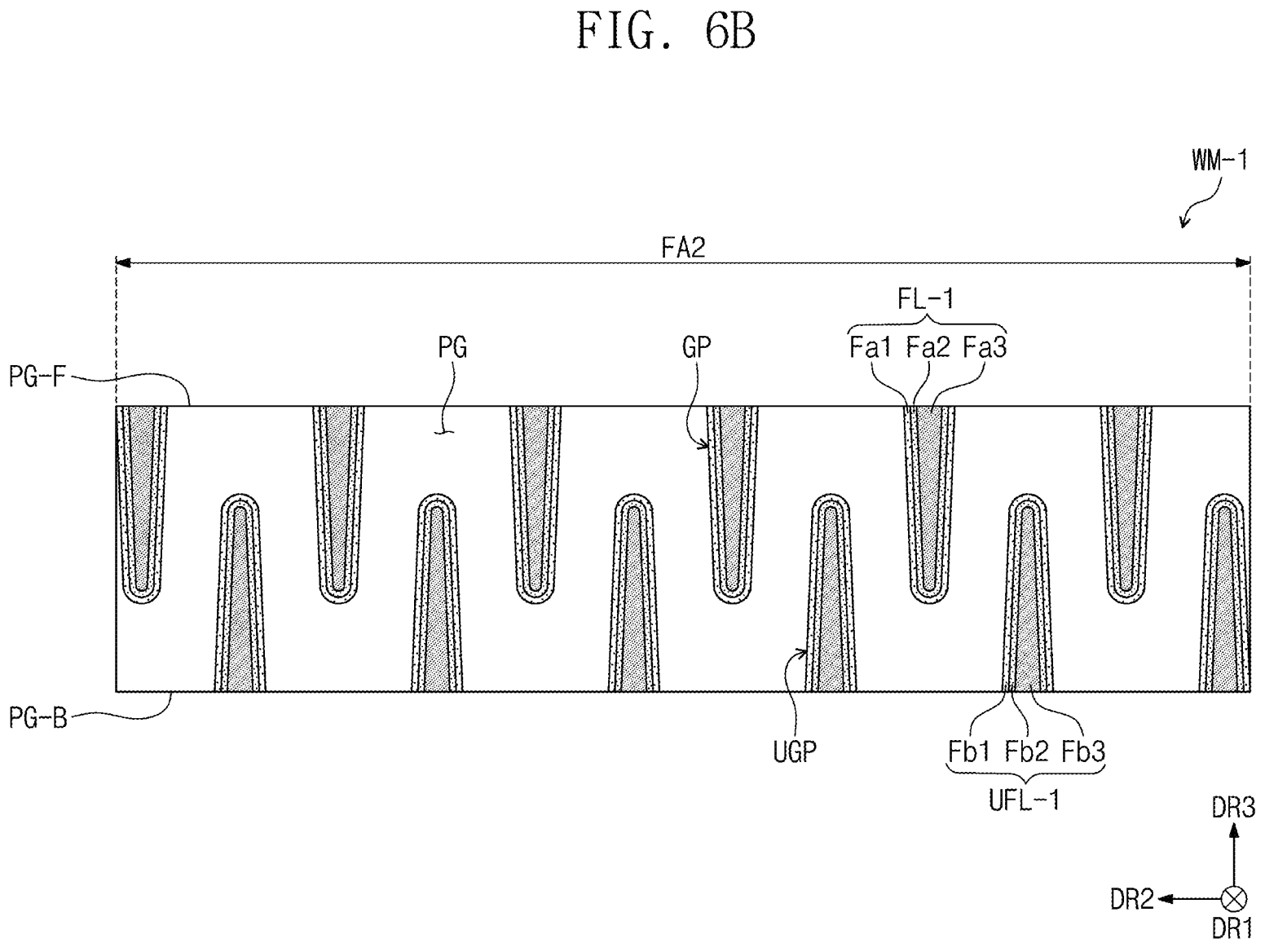

FIGS. 6A and 6B are each a schematic cross-sectional view illustrating a portion of a cross-section of a window according to an embodiment of the disclosure. FIGS. 6A and 6B illustrate cross-sections of windows WM and WM-1 in folding areas FA2, respectively. FIGS. 6A and 6B illustrate patterned glasses PG, filling layers FL and FL-1, and lower filling layers UFL and UFL-1 among components of the windows WM and WM-1, respectively.

Referring to FIG. 6A, the patterned glass PG may include the patterned part PP (refer to FIG. 5B) corresponding to the folding area FA2. The patterned part PP of the patterned glass PG may include groove patterns GP and lower groove patterns UGP. In an embodiment of the disclosure, each of the groove patterns GP may have a groove shape recessed from a top surface PG-F of the patterned glass PG. Each of the lower groove patterns UGP may have a groove shape recessed from a bottom surface PG-B of the patterned glass PG.

Each of the groove patterns GP and the lower groove patterns UGP may have a stripe shape extending in a direction (e.g., first direction DR1) parallel to the folding axis FX2 (e.g., refer to FIG. 1A). The groove patterns GP may be spaced apart from each other in the second direction DR2, and the lower groove patterns UGP may be spaced apart from each other in the second direction DR2. For example, each of the groove patterns GP may include first sub-groove patterns that are spaced apart from each other in the first direction DR1. Each of the first sub-groove patterns may have a stripe shape extending in the first direction DR1.

The groove patterns GP and the lower groove patterns UGP may be filled with the filling layer FL and the lower filling layer UFL, respectively. Recessed spaces defined by the groove patterns GP may be filled with the filling layer FL, and recessed spaces defined by the lower groove patterns UGP may be filled with the lower filling layer UFL.

The filling layer FL and the lower filling layer UFL may include a first filling part Fa1 and a first lower filling part Fb1, respectively. For example, the filling layer FL may include the first filling part Fa1, and the lower filling layer UFL may include the first lower filling part Fb1. The first filling part Fa1 and the first lower filling part Fb1 may be disposed on inner surfaces of the groove patterns GP and the lower groove patterns UGP, respectively. The first filling part Fa1 and the first lower filling part Fb1 may be in contact with the recessed spaces defined by the groove patterns GP and the lower groove patterns UGP, respectively. For example, the first filling part Fa1 may be disposed on inner surfaces of the groove patterns GP, and the second filling part Fb1 may be disposed on inner surfaces of the lower groove patterns UGP. In the disclosure, the first filling part Fa1 may be referred to as a “reflection preventing part.”

The filling layer FL and the lower filling layer UFL may include a second filling part Fa2 and a second lower filling part Fb2, respectively. For example, the filling layer FL may include the second filling part Fa2, and the lower filling layer UFL may include the second lower filling part Fb2. The second filling part Fa2 and the second lower filling part Fb2 may be disposed on inner surfaces of the first filling part Fa1 and the first lower filling part Fb1, respectively. The second filling part Fa2 and the second lower filling part Fb2 may be in contact with the first filling part Fa1 and the first lower filling part Fb1, respectively. For example, the second filling part Fa2 may be disposed on an inner surface of the first filling part Fa1, and the second lower filling part Fb2 may be disposed on an inner surface of the first lower filling part Fb1. For example, the first filling part Fa1 may be disposed between the second filling part Fa2 and the patterned glass PG, and the first lower filling part Fb1 may be disposed between the second lower filling part Fb2 and the patterned glass PG. Accordingly, the second filling part Fa2 and the second lower filling part Fb2 may be spaced apart from the patterned glass PG through the first filling part Fa1 and the first lower filling part Fb1, respectively.

Each of the second filling part Fa2 and the second lower filling part Fb2 may include a synthetic resin material. In an embodiment of the disclosure, each of the second filling part Fa2 and the second lower filling part Fb2 may include at least one selected from a urethane-based resin, an epoxy-based resin, a polyester-based resin, a polyether-based resin, an acrylate-based resin, an acrylonitrile-butadiene-styrene resin (ABS resin), and rubber. For example, each of the second filling part Fa2 and the second lower filling part Fb2 may include at least one of phenylene, polyethylene terephthalate (PET), polyimide (PI), polyamide (PAI), polyethylene naphthalate (PEN), and polycarbonate (PC). In the disclosure, the second filling part Fa2 may be referred to as a “resin part.”

The first filling part Fa1 and the second filling part Fa2 may have substantially the same refractive index for light having a first wavelength. In the disclosure, “being substantially the same” includes not only a case in which components are completely the same in physical terms such as refractive index or thickness, but also a case in which there is a difference within a margin of error generated during a process in spite of the same design. The first lower filling part Fb1 and the second lower filling part Fb2 may have substantially the same refractive index for the light having the first wavelength. The first and second filling parts Fa1 and Fa2 and the first and second lower filling parts Fb1 and Fb2 may have the same refractive index as that of the patterned glass PG for the light having the first wavelength. For example, all of the first and second filling parts Fa1 and Fa2, the first and second lower filling parts Fb1 and Fb2, and the patterned glass PG may have a same refractive index for the light having the first wavelength. In the disclosure, the refractive indexes of the first and second filling parts Fa1 and Fa2 and the patterned glass PG for the light having the first wavelength may be referred to as a 1-1-th refractive index, a 2-1-th refractive index, and a 3-1-th refractive index, respectively. The first and second lower filling parts Fb1 and Fb2 are made of same materials through same processes as the first and second filling parts Fa1 and Fa2, respectively, and the refractive indexes of the first and second lower filling parts Fb1 and Fb2 for the light having the first wavelength may be the same as the 1-1-th refractive index and the 2-1-th refractive index, respectively. For example, all of the 1-1-th refractive index, the 2-1-th refractive index, and the 3-1-th refractive index may be substantially the same as each other.

The first wavelength may be in a range of about 500 nm to about 600 nm. For example, the first wavelength may have a value of about 570 nm to about 600 nm, and the light having the first wavelength may be green light. All of the first and second filling parts Fa1 and Fa2, the first and second lower filling parts Fb1 and Fb2, and the patterned glass PG may have a same refractive index for the green light.

In case that all of the 1-1-th refractive index, the 2-1-th refractive index, and the 3-1-th refractive index are substantially the same as each other, reflectance of the window WM for the light having the first wavelength may approach 0. The reflectance of the window WM may be expressed as Equation K. In case that the reflectance of the window WM for the light having the first wavelength satisfies Equation K, the display device including the window WM according to an embodiment may improve visibility in a region of the first wavelength, e.g., visibility for the green light.

$$\frac{(n2\times n3-n1^2)^2}{(n2\times n3+n1^2)^2} \quad \text{[Equation K]}$$

In Equation K, n1, n2, and n3 are the refractive indexes of the first filling part Fa1, the second filling part Fa2, and the patterned glass PG, respectively.

The first filling part Fa1 and the second filling part Fa2 may have different values of refractive index for light having a second wavelength. The first lower filling part Fb1 and the second lower filling part Fb2 may have different refractive indexes for the light having the second wavelength. The refractive index of the patterned glass PG for the light having the second wavelength may be different from the refractive index of each of the first and second filling parts Fa1 and Fa2 and the first and second lower filling parts Fb1 and Fb2. In the disclosure, the refractive indexes of the first and second filling parts Fa1 and Fa2 and the patterned glass PG for the light having the second wavelength may be referred to as a 1-2-th refractive index, a 2-2-th refractive index, and a 2-3-th refractive index, respectively. The refractive indexes of the first and second lower filling parts Fb1 and Fb2 for the light having the second wavelength may be the same as the 1-2-th refractive index and the 2-2-th refractive index, respectively. For example, the 1-2-th refractive index may be different from the 2-2-th refractive index, and the 3-2-th refractive index may be different from each of the 1-2-th refractive index and the 2-2-th refractive index.

The 1-2-th refractive index may have a value between the 2-2-th refractive index and the 3-2-th refractive index. For example, the 1-2-th refractive index may have a smaller value than the 2-2-th refractive index, and a larger value than the 3-2-th refractive index. For example, the 1-2-th refractive index may have a value similar to the square root of a value obtained by multiplying 2-2-th refractive index by the 3-2-th refractive index. A relationship between the 1-2-th refractive index, the 2-2-th refractive index, and the 3-2-th refractive index may be expressed as the following Equation 1.

$$\sqrt{n2\times n3}-0.005<n1<\sqrt{n2\times n3}+0.005 \quad \text{[Equation 1]}$$

In Equation 1, n1, n2, and n3 are the refractive indexes of the first filling part Fa1, the second filling part Fa2, and the patterned glass PG, respectively. For example, in Equation 1, n1, n2, and n3 may mean the 1-2-th refractive index, the 2-2-th refractive index, and the 3-2-th refractive index, respectively. Referring to Equation 1, n1 may have a value within a margin of error of about 0.005 based on an intermediate value of $\sqrt{n2\times n3}$. For example, n1 may have a value within a margin of error of about 0.003 based on an intermediate value of $\sqrt{n2\times n3}$.

The second wavelength may be in a range of about 410 nm to about 500 nm. For example, the second wavelength may be in a range of about 600 nm to about 700 nm. The second wavelength may be a relatively long wavelength or short wavelength compared to the first wavelength. The light having the second wavelength may be red light or blue light. The first filling part Fa1 and the first lower filling part Fb1 may have different refractive indexes for the red or blue light from the second filling part Fa2 and the second lower filling part Fb2, respectively. Each of the first and second filling parts Fa1 and Fa2 and the first and second lower filling parts Fb1 and Fb2 may have a different refractive index for the red or blue light from the patterned glass PG. In the disclosure, the light having the second wavelength may be referred to as "first visible light".

In case that the 1-2-th refractive index has a value between the 2-2-th refractive index and the 3-2-th refractive index, or the relationship between the 1-2-th refractive index, the 2-2-th refractive index, and the 3-2-th refractive index satisfies Equation 1, the reflectance of the window WM which is expressed as Equation K may approach 0. For example, the reflectance of the window WM for the second wavelength may approach 0. In case that the reflectance of the window WM for the light having the second wavelength approaches 0, the display device including the window WM according to an embodiment may improve visibility also in a region of the second wavelength, e.g., a region of the red light or the blue light.

In another embodiment, the second wavelength may be in a range of about 410 nm to about 500 nm, or a third wavelength may be in a range of about 600 nm to about 700 nm. In other embodiment, the second wavelength may be in a range of about 410 nm to about 500 nm and the third wavelength may be in a range of about 600 nm to about 700 nm. The first filling part Fa1 and the second filling part Fa2 may have different refractive indexes for the light having the second wavelength, and the first filling part Fa1 and the second filling part Fa2 may have different refractive indexes for the light having the third wavelength. The refractive index of the patterned glass PG for the light having the third wavelength may be different from the refractive index of each of the first and second filling parts Fa1 and Fa2. In the disclosure, the refractive indexes of the first and second filling parts Fa1 and Fa2 and the patterned glass PG for the light having the third wavelength may be referred to as a 1-3-th refractive index, a 2-3-th refractive index, and a 3-3-th refractive index, respectively. The refractive indexes of the first and second lower filling parts Fb1 and Fb2 for the light having the third wavelength may be the same as the 1-3-th refractive index and the 2-3-th refractive index, respectively.

The 1-2-th refractive index may have a value between the 2-2-th refractive index and the 3-2-th refractive index, and the 1-3-th refractive index may have a value between the 2-3-th refractive index and the 3-3-th refractive index. Accordingly, the reflectance of the window WM for the light having the second wavelength may approach 0, and the reflectance of the window WM for the light having the third wavelength may approach 0. Accordingly, the display device including the window WM according to an embodiment may improve visibility in regions of the second and third wavelengths, e.g., regions of the red light and the blue light.

Referring to FIG. 6B, the filling layer FL-1 may include first and second filling parts Fa1 and Fa2, and further include a third filling part Fa3. The lower filling layer UFL-1 may include first and second lower filling parts Fb1 and Fb2, and further include a third lower filling part Fb3. The third filling part Fa3 and the third lower filling part Fb3 may be disposed on inner surfaces of the second filling part Fa2 and the second lower filling part Fb2, respectively. For example, the third filling part Fa3 may be disposed on the inner surface of the second filling part Fa2, and the third lower filling part Fb3 may be disposed on the inner surface of the second lower filling part Fb2. The third filling part Fa3 and the third lower filling part Fb3 may be in contact with the second filling part Fa2 and the second lower filling part Fb2, respectively. For example, the first filling part Fa1, the second filling part Fa2, and the third filling part Fa3 may be stacked in sequence from the inner surface of the groove pattern GP.

For the light having the first wavelength, the refractive index of each of the third filling part Fa3 and the third lower filling part Fb3 may be substantially the same as the refractive indexes of the first and second filling parts Fa1 and Fa2, the first and second lower filling parts Fb1 and Fb2, and the patterned glass PG. In the disclosure, the refractive index of the third filling part Fa3 for the light having the first wavelength may be referred to as a 4-1-th refractive index. In case that the third lower filling part Fb3 and the third filling part Fa3 are made of a same material through a same process, the refractive index of the third lower filling part Fb3 for the light having the first wavelength may be the same as the 4-1-th refractive index.

In case that all of the 1-1-th refractive index, the 2-1-th refractive index, the 3-1-th refractive index, and the 4-1-th refractive index are substantially the same as each other, reflectance of the window WM-1 for the light having the first wavelength may approach 0. The reflectance of the window WM-1 may be expressed as Equation K−1. In case that the reflectance of the window WM-1 for the light having the first wavelength satisfies Equation K−1, the display device including the window WM-1 according to an embodiment may improve visibility in a region of the first wavelength, e.g., visibility for the green light.

$$\frac{(n2^2 \times n3 - n1^2 \times n4^2)^2}{(n2^2 \times n3 + n1^2 \times n4^2)^2} \quad \text{[Equation K−1]}$$

In Equation K−1, n1, n2, n3 and n4 are the refractive indexes of the first filling part Fa1, the second filling part Fa2, the patterned glass PG, and the third filling part Fa3, respectively.

For the light having the second wavelength, the refractive index of each of the third filling part Fa3 and the third lower filling part Fb3 may be different from each of the refractive indexes of the first and second filling parts Fa1 and Fa2, the first and second lower filling parts Fb1 and Fb2, and the patterned glass PG. In the disclosure, the refractive index of the third filling part Fa3 for the light having the second wavelength may be referred to as a 4-2-th refractive index. In case that the third lower filling part Fb3 and the third filling part Fa3 are made of a same material through a same process, the refractive index of the third lower filling part Fb3 for the light having the first wavelength may be the same as the 4-2-th refractive index.

The 1-2-th refractive index may have a value between the 3-2-th refractive index and the 4-2-th refractive index. Accordingly, the reflectance of the window WM-1 for the light having the second wavelength may approach 0. In case that the reflectance of the window WM-1 for the light having the second wavelength approaches 0, the display device including the window WM-1 according to an embodiment may improve visibility in a region of the second wavelength, e.g., a region of the red light or the blue light.

Hereinafter, detailed description of characteristic evaluation results of a display device according to an embodiment of the disclosure is provided below with reference to Example and Comparative Examples. Example described below is one example for enhancing understanding of the disclosure, and the disclosure is not limited thereto.

(Manufacture and Evaluation of Display Device)

Display devices of Comparative Examples are different from the display devices of FIG. 2C at least in that refractive indexes of a filling layer and a patterned glass are different from each other. A window according to each of Example, Comparative Example 1, and Comparative Example 2 has the same structure as in FIG. 6A. The measurement conditions and evaluation results of Example and Comparative Examples are shown in Table 1. Respective refractive indexes of a first filling part, a second filling part, and the patterned glass that are included in each of Example, Comparative Example 1, and Comparative Example 2 are indicated by a first refractive index, a second refractive index, and a third refractive index, respectively. Each of the first refractive index, the second refractive index, and the third refractive index was measured in wavelength ranges shown in Table 1. In Table 1, a wavelength of about 589 nm may be the above-described first wavelength, and wavelengths of about 414 nm, about 471 nm, and about 651 nm may be the above-described second wavelength. Accordingly, the first refractive index, the second refractive index, and the third refractive index in the first wavelength of about 589 nm may mean the above-described 1-1-th refractive index, 2-1-th refractive index, and 3-1-th refractive index, respectively, and the first refractive index, the second refractive index, and the third refractive index in each of the second wavelengths of about 414 nm, about 471 nm, and about 651 nm may mean the above-described 1-2-th refractive index, 2-2-th refractive index, and 3-2-th refractive index, respectively. In the evaluation of the display device in the following Table 1, reflectance of the window was measured according to Equation K described above.

TABLE 1

| | Wave-length (nm) | First refractive index | Second refractive index | Third refractive index | Reflectance of window ($e^{-8}$) |
|---|---|---|---|---|---|
| Example 1 | 414 | 1.5199 | 1.5220 | 1.5172 | 3.946 |
| | 471 | 1.5127 | 1.5142 | 1.5107 | 2.754 |
| | 589 | 1.5050 | 1.5050 | 1.5050 | 0 |
| | 651 | 1.5026 | 1.5015 | 1.5039 | 0.4386 |
| Comparative Example 1 | 414 | 1.5220 | 1.5220 | 1.5172 | 249.4 |
| | 471 | 1.5142 | 1.5142 | 1.5107 | 133.9 |
| | 589 | 1.5050 | 1.5050 | 1.5050 | 0 |
| | 651 | 1.5015 | 1.5015 | 1.5039 | 63.77 |
| Comparative Example 2 | 414 | 1.5199 | 1.5199 | 1.5172 | 79.03 |
| | 471 | 1.5127 | 1.5127 | 1.5107 | 43.76 |
| | 589 | 1.5050 | 1.5050 | 1.5050 | 0 |
| | 651 | 1.5026 | 1.5026 | 1.5039 | 18.70 |

Referring to Table 1, in Example 1, in the first wavelength of about 589 nm, the 1-1-th refractive index of the first filling part, the 2-1-th refractive index of the second filling part, and the 3-1-th refractive index of the patterned glass are the same as each other. In each of the second wavelengths of about 414 nm, about 471 nm, and about 651 nm, the 1-2-th refractive index of the first filling part according to Example 1 has a value between the 2-2-th refractive index of the second filling part and the 3-2-th refractive index of the patterned glass. In Comparative Example 1, in the first wavelength of about 589 nm, the 1-1-th refractive index, the 2-1-th refractive index, and the 3-1-th refractive index are the same as each other. However, in each of the second wavelengths of about 414 nm, about 471 nm, and about 651 nm, the 1-2-th refractive index of Comparative Example 1 does not have a value between the 2-2-th refractive index and the 3-2-th refractive index, but the 1-2-th refractive index of Comparative Example 1 and the 2-2-th refractive index have a same value. In Comparative Example 2, in the first wavelength of about 589 nm, the 1-1-th refractive index, the 2-1-th refractive index, and the 3-1-th refractive index have a same value. However, in each of the second wavelengths of about 414 nm, about 471 nm, and about 651 nm, the 1-2-th refractive index of Comparative Example 2 does not have a value between the 2-2-th refractive index and the 3-2-th refractive index, but the 1-2-th refractive index of Comparative Example 2 and the 2-2-th refractive index have a same value. Referring to the results of the window reflectance in Table 1, the window reflectance of Example 1 is reduced compared to the window reflectance of Comparative Examples 1 and 2. The 1-2-th refractive index has the value between the 2-2-th refractive index and the 3-2-th refractive index, and the display device according to an embodiment of the disclosure may have the reduced window reflectance in the region of the red light or blue light, which is the region of the second wavelength, and have the improved visibility. Since the display device according to an embodiment of the disclosure includes the first filling part having the 1-2-th refractive index for the light having the second wavelength, and the second filling part having the 2-2-th refractive index for the light having the second wavelength, the patterned part inside the window may be prevented from being visible.

According to an embodiment of the disclosure, the filling layer of the window may include the first filling part having the value between the refractive index of the second filling part and the refractive index of the patterned part for the region of the long wavelength or short wavelength. Accordingly, the reflectance of the window may be reduced and prevent the patterned part from being visible.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
- a folding area foldable around a virtual folding axis, and a non-folding area adjacent to the folding area;
- a display panel; and
- a window disposed on the display panel, wherein
- the window comprises:
  - a patterned glass comprising:
    - a patterned part having at least one groove pattern on a top surface of the patterned part, and corresponding to the folding area; and
    - a non-patterned part adjacent to the patterned part and corresponding to the non-folding area; and
  - a filling layer filled in the at least one groove pattern,
- the filling layer comprises:
  - a first filling part that is in contact with the patterned part; and
  - a second filling part that is in contact with the first filling part,
- a 1-1-th refractive index of the first filling part for light having a first wavelength is substantially equal to a 2-1-th refractive index of the second filling part for the light having the first wavelength, and
- a 1-2-th refractive index of the first filling part for light having a second wavelength different from the first wavelength is different from a 2-2-th refractive index of the second filling part for the light having the second wavelength.

2. The display device of claim 1, wherein a 3-1-th refractive index of the patterned glass for the light having the first wavelength is substantially equal to each of the 1-1-th refractive index and the 2-1-th refractive index.

3. The display device of claim 1, wherein
- a 3-2-th refractive index of the patterned glass for the light having the second wavelength is different from each of the 1-2-th refractive index and the 2-2-th refractive index, and
- the 1-2-th refractive index has a value between the 2-2-th refractive index and the 3-2-th refractive index.

4. The display device of claim 3, wherein the 1-2-th refractive index is less than the 2-2-th refractive index, and greater than the 3-2-th refractive index.

5. The display device of claim 1, wherein
- the first wavelength is in a range of about 500 nm to about 600 nm, and
- the second wavelength is in a range of about 410 nm to about 500 nm, or in a range of about 600 nm to about 700 nm.

6. The display device of claim 5, wherein the first wavelength is in a range of about 570 nm to about 600 nm.

7. The display device of claim 1, wherein a 1-3-th refractive index of the first filling part for light having a third wavelength, which is different from each of the second wavelength and the first wavelength, is different from a 2-3-th refractive index of the second filling part for the light having the third wavelength.

8. The display device of claim 7, wherein
- the first wavelength is in a range of about 500 nm to about 600 nm,
- the second wavelength is in a range of about 410 nm to about 500 nm, and
- the third wavelength is in a range of about 600 nm to about 700 nm.

9. The display device of claim 7, wherein the 1-3-th refractive index has a value between the 2-3-th refractive index and a 3-3-th refractive index of the patterned glass for the light having the third wavelength.

10. The display device of claim 1, wherein
- the filling layer further comprises a third filling part that is in contact with the second filling part, and
- the first filling part, the second filling part, and the third filling part are stacked in sequence from an inner surface of the at least one groove pattern.

11. The display device of claim 1, wherein the second filling part comprises at least one of a urethane-based resin, an epoxy-based resin, a polyester-based resin, a polyether-based resin, an acrylate-based resin, and an ABS resin.

12. The display device of claim 1, wherein
the at least one groove pattern comprises a plurality of groove patterns, and
the plurality of groove patterns are spaced apart from each other.

13. The display device of claim 12, wherein
the virtual folding axis extends in a first direction,
the non-folding area comprises:
a first non-folding area; and
a second non-folding area spaced apart from the first non-folding area in a second direction perpendicular to the first direction,
the folding area is disposed between the first non-folding area and the second non-folding area, and
the plurality of groove patterns are arranged in the second direction.

14. The display device of claim 1, wherein
a lower groove pattern is in a bottom surface of the patterned part, and
the window further comprises a lower filling layer filled in the lower groove pattern.

15. The display device of claim 1, wherein the window further comprises a window protective layer disposed on the patterned glass.

16. A display device comprising:
a folding area foldable around a virtual folding axis, and a non-folding area adjacent to the folding area;
a display panel; and
a window disposed on the display panel and satisfying Equation 1 below, wherein
the window comprises:
a patterned glass comprising:
a patterned part having a groove pattern on a top surface of the patterned part, and corresponding to the folding area; and
a non-patterned part adjacent to the patterned part and corresponding to the non-folding area; and
a filling layer filled in the groove pattern, and
the filling layer comprises:
a first filling part that is in contact with the patterned part; and
a second filling part that is in contact with the first filling part, $$\sqrt{n2 \times n3} - 0.005 < n1 < \sqrt{n2 \times n3} + 0.005, \quad \text{[Equation 1]}$$

wherein, in Equation 1, n1, n2, and n3 are refractive indexes of the first filling part, the second filling part, and the patterned glass, respectively, for first visible light.

17. The display device of claim 16, wherein, in Equation 1, n1, n2, and n3 have different values from each other.

18. The display device of claim 16, wherein, in Equation 1, each of n1, n2, and n3 has a value in a range of about 1.4 to about 1.6.

19. The display device of claim 16, wherein, in Equation 1, the first visible light is red light or blue light.

20. A window comprising:
a patterned glass comprising:
a patterned part having a groove pattern on a top surface of the patterned part, at least a portion of the patterned part being foldable; and
a non-patterned part adjacent to the patterned part; and
a filling layer filled in the groove pattern, wherein
the filling layer comprises:
a reflection preventing part that is in contact with the patterned part; and
a resin part that is in contact with the reflection preventing part, wherein
a 1-1-th refractive index of the reflection preventing part for light having a first wavelength is substantially equal to a 2-1-th refractive index of the resin part for the light having the first wavelength,
a 1-2-th refractive index of the reflection preventing part for light having a second wavelength is different from a 2-2-th refractive index of the resin part for the light having the second wavelength, and
the first wavelength is different from the second wavelength.

* * * * *